Aug. 9, 1966
W. P. REID ET AL
3,265,414
SEALED PIPE JOINT
Filed July 10, 1964
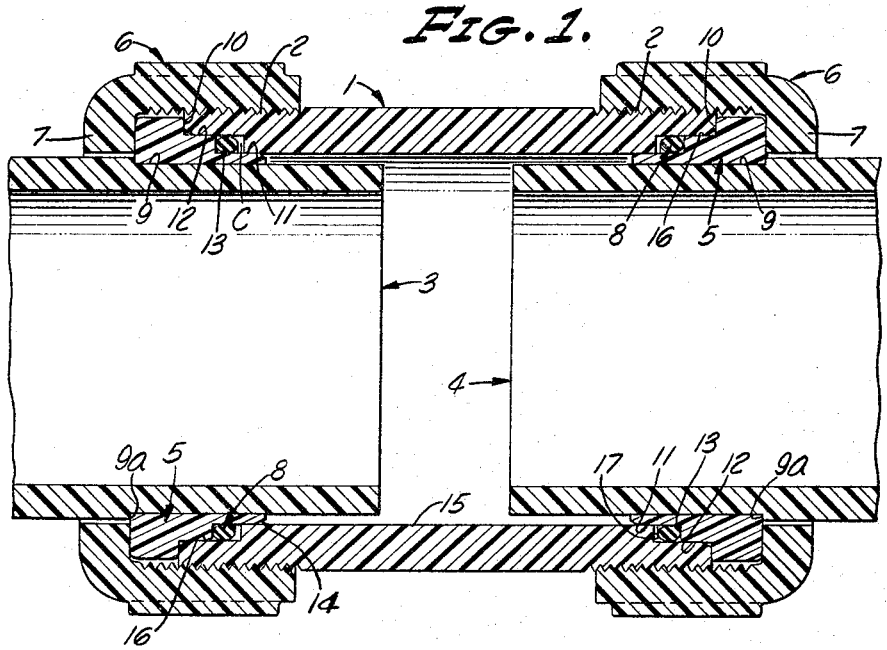
FIG. 1.
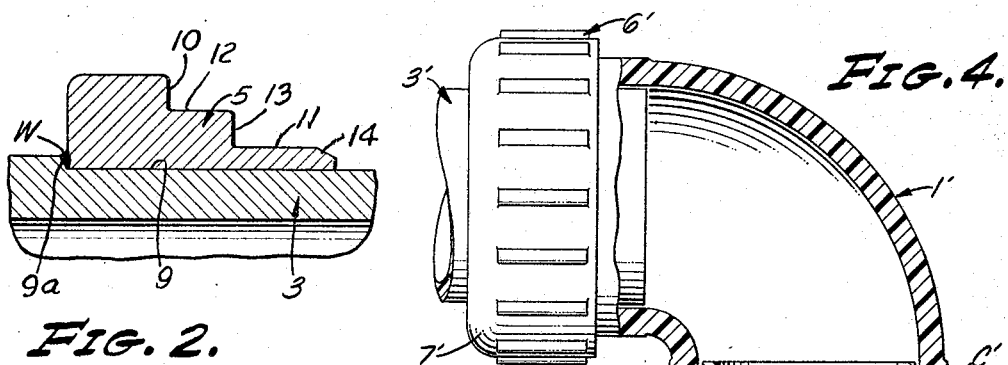
FIG. 2.
FIG. 4.
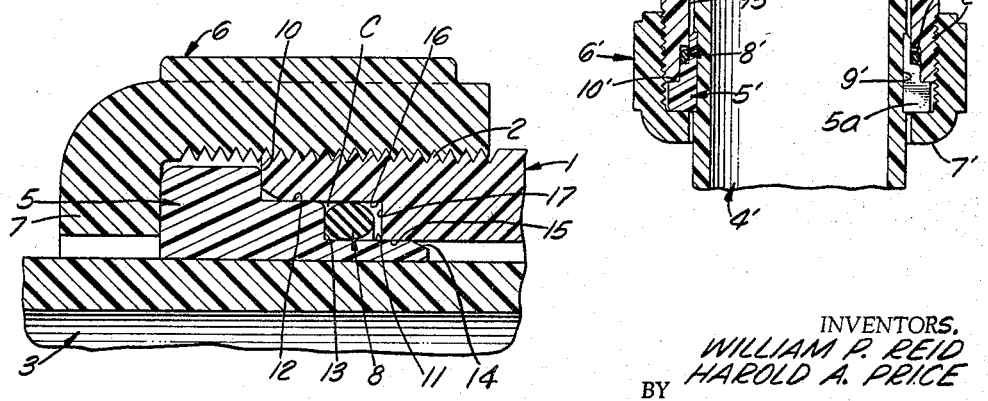
FIG. 3.
INVENTORS.
WILLIAM P. REID
HAROLD A. PRICE
BY
Paul A. Weilein
ATTORNEY

United States Patent Office 3,265,414
Patented August 9, 1966

3,265,414
SEALED PIPE JOINT
William P. Reid, 2610 E. 67th St., Long Beach, Calif., and Harold A. Price, Orange, Calif.; said Price assignor to said Reid
Filed July 10, 1964, Ser. No. 381,806
2 Claims. (Cl. 285—348)

This invention relates to an improved pipe joint.

In a pipe joint wherein a sealing element such as a ring is seated against the opposed surfaces of the pipes or similar element to be joined, irregularities that frequently occur in such surfaces may interfere with or prevent the formation of a reliable seal.

It is an object of this invention to provide a sealed pipe joint which will assure the formation of a reliable seal without relying upon the surfaces of the pipes or similar elements to be coupled as seating and sealing surfaces for a sealing ring and which will maintain the reliable seal at all times regardless of stresses that may be occasioned in the joint.

It is another object of this invention to provide a pipe joint of the character described in which a gland of novel formation fixed on a male element or pipe, together with a novel formation in the bore of the female element of the joint, make it possible to join these elements in such a manner as to provide an annular chamber having uniformly radially spaced walls as seating surfaces for the sealing ring to thereby assure a reliable seal.

It is a further object of this invention to provide a sealed joint assembly of the character described wherein the gland is affixed to the male pipe or element of the joint so that inner portions thereof will extend into the bore of the female pipe or element while the outer portion of the gland will abut an end of the female element. Formations on the gland and in the bore of the female element, respectively, provide the sealing ring containing chamber having concentric walls affording reliable seating surfaces for the sealing rings such that an effective sealing action will be maintained at all times in the joint. These formations in the bore of the female element and on the gland also define opposed axially spaced shoulders constituting the axially spaced and radially extending walls of the sealing ring receiving chamber. In addition, the formations on the gland provide a shoulder which will abut the outer end of the female element so as to hold the shoulders forming the axially spaced walls of the sealing ring chamber in predetermined spaced relation to maintain a predetermined dimension in the sealing ring chamber and assure that the ring will be free to seat properly against the radially spaced concentric walls of the chamber.

A flanged nut may be screwed onto the threaded end of the female element of the joint so that the flange thereof will abut the outer end of the gland and thereby hold the gland in position to maintain the aforesaid uniformity of the dimension of the ring containing chamber. With this arrangement, stresses applied to the joint and irregularities in the formation of the elements of pipes being joined will not affect the concentric relationship of the walls of the chambers against which the sealing ring is sealingly engaged.

It is a further object to provide a pipe joint assembly of the character described in which with the parts thereof constructed as herein specified may be easily assembled without use of tools.

Other objects and advantages of the invention will be hereinafter described or will become apparent to those skilled in the art, and the novel features of the invention will be defined in the appended claims.

Referring to the drawing:

FIG. 1 is a longitudinal sectional view of a sealed pipe joint assembly embodying the present invention as it would appear in a coupling of two pipes within a coupling sleeve;

FIG. 2 is a fragmentary sectional view of a metal pipe having welded thereon a gland corresponding to the gland shown in FIG. 1 but formed of metal;

FIG. 3 is a longitudinal fragmentary sectional view on an enlarged scale of a joint identical with the joint shown in FIG. 1 except that the end of the pipe on which the gland is fixed does not have the prepared surface shown in FIG. 1; and FIG. 4 is a fragmentary side elevation partly in section of a modified form of the joint of the present invention.

The illustrative form of a pipe joint assembly embodying the present invention is shown in FIG. 1 as it would be employed in a coupling wherin a sealing sleeve 1 as the female element of the joint has externally screw threaded ends 2 and is adapted to receive in the bore thereof a pair of male elements such as the pipes 3 and 4.

The pipes 3 and 4 are held in coupled relation with the sleeve 1 by means of annular glands 5 fixed on the pipes and extending into the bore of the sleeve, there being flanged nuts 6 threaded onto the screw threaded ends 2 of the sleeve so that the flanges 7 of the nut will abut the outer ends of the glands 5 to hold the latter in place with sealing rings 8 interposed between the glands and the sleeve to form a pair of seals.

In the formation of the joint assembly, the end portions of the pipes 3 and 4 are reduced in diameter as may be required to provide cylindrical outer surfaces 9 of proper size to accommodate the glands 5. These surfaces 9 are formed so as to be cylindrical regardless of the pipes being out-of-round and provide shoulders 9a against which glands 5 abut so as to be immovably fixed on the pipe with the aid of a suitable weld of the glands to the pipes.

The sleeve 1, glands 5, nuts 6, and pipes 3 and 4 as shown in FIGS. 1 and 3, are made of a suitable plastic material, since the joint assembly of this invention is particularly well suited for forming seals in joints of pipes made of plastic material. In this connection it should be noted that the plastic glands 5 may be fixed to the plastic pipes 3 and 4 by any suitable cementing or bonding agent, it being preferable, however, to use a bonding agent that will, in effect, chemically weld the glands to the pipes. It is to be understood, however, that the parts above noted may be made of other materials and are subject to the formation of joints with pipes made of material other than plastic. For example, as shown in FIG. 2, the pipe 3 is made of metal and has the metal gland 5 welded thereto as at W where the gland abuts the shoulder 9a on the pipe.

It is the purpose of this invention to provide formations on a gland 5 and in the bore of the female joint element, in this case the coupling sleeve 1, such that there will be provided between the sleeve and the glands chambers C for containing the sealing ring 8. These chambers have concentric radially spaced walls of predetermined axial extent between axially opposed portions of the glands and sleeve to assure that the sealing rings will be free in the chambers to sealingly engage the radially spaced concentric walls of the chambers.

Each of the glands 5 has an inner end portion that is extended into the bore of the sleeve 1 and an outer end portion that will extend outwardly from the ends of the sleeve when the sealed joints are completed in the coupling. The exterior of each gland is stepped so that on the inner portion there are provided a pair of circumferential bearing surfaces 11 and 12 axially and radially spaced from one another. These bearing surfaces are precisely formed so as to be cylindrical. This stepped formation on each gland provides a radially extending shoulder 13 between the two bearing surfaces 11 and 12 and forms the radially extended shoulder 10 at an extremity of the bearing surface 12. Extension of the inner portion of each gland 5 into the bore of the sleeve 1 is facilitated by having the outer end of the inner portion bevelled as at 14.

Within each end portion of the bore of the sleeve 1 is a counterbore which defines on a part of the bore proper a bearing surface 15 and forms within the counterbore a bearing surface 16. These two bearing surfaces are axially and radially spaced from one another with a radially extending shoulder 17 therebetween and are precisely of cylindrical form regardless of irregularities in the form of the sleeve.

In assembling the coupling, when the pipes 3 and 4 with glands 5 therein are inserted into the bore of the sleeve 1, portions of the glands will extend into the bore of the sleeve. The shoulders 10 on the glands will abut the outer ends of the sleeve to limit the extension of the glands into the sleeve so that the cylindrical bearing surfaces 11 and 12 on the glands will seat on the cylindrical bearing surfaces 15 and 16 in the bore of the sleeve with the shoulders 13 on the glands axially spaced from the shoulders 17 on the sleeve. With this arrangement, there will be formed between the spaced shoulders 13 and 17 and the radially spaced and opposed portions of the bearing surfaces 11 and 16, a pair of the annular chambers C of uniform cross-section in which the sealing rings 8 are mounted.

It should be noted that the bearing surfaces 11 and 12 on the glands 5 in seating on the bearing surfaces 15 and 16 on the sleeve, assure that the walls of the chambers C on which the sealing rings 8 are seated, will be uniformly radially spaced from one another regardless of out-of-round or elliptical or otherwise irregular formations on the surfaces of the pipes 3 and 4. Moreover, the stop shoulders 10 on the glands 5 assure that the opposed shoulders 13 and 17 on the glands 5 and sleeve 1, respectively, will be maintained axially spaced a predetermined extent to provide adequate spaces in the chambers C for an effective sealing action of the sealing rings, regardless of stresses transmitted to the coupling.

FIG. 3 illustrates a joint embodying the same construction and formation as shown in FIG. 1 except that the plastic pipe 3 does not have the exterior surfaces turned down to receive the gland 5. Otherwise, the joint is the same as shown in FIG. 1. This elimination of a prepared exterior surface such as the surface 9 on the pipe, as shown in FIG. 1, to fit the gland, is made possible where the pipe is new and is of such formation that the gland may be fitted thereon without preparing the exterior surface to accommodate the gland. In this arrangement the gland may be cemented or welded on the pipe in the same manner as described in connection with the joint shown in FIG. 1.

It should be noted that the joint at one end of the sleeve formed with one pipe and one gland illustrates how this invention may be embodied to advantage in a simple connection of a male joint element with a female joint element wherein the female element has a counterbore corresponding to that shown in one end of the sleeve for cooperation with a gland fixed on the male element and having the same configuration as one of the glands shown in the coupling sleeve. With this arrangement, in a simple joint of two pipes, there will be provided a chamber of uniform diameter throughout and in which a sealing ring will maintain a reliable sealing action by its engagement with the radially opposed and uniformly spaced surfaces or walls of the chamber.

FIG. 4 illustrates how a somewhat modified joint embodying this invention is used in an elbow joint wherein the female element 1' corresponds to the sleeve 1 in FIG 1. The other parts of the elbow corresponding to those parts shown in FIG. 1 are identified by the same reference characters plus the prime character. In this form of the joint, each of the pipes 3' and 4' is provided with an annular groove or recess 9' to receive the gland 5', which latter is split as at 5a to permit the mounting of the gland in the groove 9'. The gland may be cemented or welded in the groove and in this connection it should be noted that the groove may be formed so as to be cylindrical regardless of any deformation of the pipe. In all other respects the gland 5 in this form of the invention and female element 1' form a chamber C' identical with chambers C as shown in FIG. 1.

While specific structural details have been shown and described, it should be understood that changes and alterations may be resorted to without departing from the spirit of the invention as defined in the appended claims.

We claim:

1. A pipe joint, including: a female element; a male pipe element in said female element; said female element having a bore and a counterbore forming a pair of cylindrical bearing surfaces axially and radially spaced from one another; a shoulder between said bearing surfaces; a gland sealingly secured on said male element with a portion of the gland extended into said bore and counterbore; said portion of said gland having a pair of cylindrical bearing surfaces axially and radially spaced from one another and engaged with said bearing surfaces on said female element; a shoulder on said gland between said bearing surfaces of the gland and spaced axially from said shoulder on said female element; portions of bearing surfaces on said female element and portions of bearing surfaces on said gland forming with said shoulders an annular chamber of uniform cross-section; a sealing ring in said chamber engaged with said portions of said bearing surfaces; said gland having a stop shoulder thereon engaged with an end of said female element to limit extension of said portion of said gland into said female element to a position for forming said chamber; and a nut threadedly engaged with said female element and engaging said gland to hold said stop shoulder against said end of said female element.

2. A sealed pipe joint assembly, comprising: a tubular female element having a bore open at both ends; pipes having end portions in the bore of said element; a gland sealingly fixed on each of said pipes so that it will extend partly into the bore of said element; said element having in each end portion thereof axially and radially spaced cylindrical bearing surfaces extending axially thereof and defined by said bore and a counterbore; each of said glands having on the exterior of the portion thereof extending into said element cylindrical bearing surfaces that are axially and radially spaced from one another and engage said bearing surfaces of said element; said element having a shoulder between the bearing surfaces at each end of said bore; each gland having a shoulder between the bearing surfaces thereon; said shoulders on said element and glands and portions of said opposed bearing surfaces on the elements and glands defining chambers of uniform cross-section for receiving sealing rings; sealing rings in said chambers; stop shoulders on said glands spaced inwardly from the outer ends of said glands for abutting the ends of said element; said outer ends of said glands extending beyond the ends of said element; and means on said sleeve for engaging said outer ends of said glands to hold said stop shoulders against said element.

References Cited by the Examiner

UNITED STATES PATENTS

| | | | |
|---|---|---|---|
| 2,396,163 | 3/1946 | Dies | 285—342 |
| 2,645,527 | 7/1953 | Walters | 285—368 X |
| 2,816,472 | 12/1957 | Boughton | 285—354 X |
| 2,935,343 | 5/1960 | Ellis | 285—349 X |
| 2,956,823 | 10/1960 | Benjamin et al. | |
| 3,004,780 | 10/1961 | Main | 285—368 X |
| 3,112,939 | 12/1963 | Graham | 285—238 |

CARL W. TOMLIN, *Primary Examiner.*

EDWARD C. ALLEN, *Examiner.*

T. A. LISLE, *Assistant Examiner.*